(12) United States Patent
Von Thal

(10) Patent No.: US 7,137,598 B2
(45) Date of Patent: Nov. 21, 2006

(54) IN-FLIGHT REFUELING SYSTEM, SENSOR SYSTEM AND METHOD FOR DAMPING OSCILLATIONS IN IN-FLIGHT REFUELING SYSTEM COMPONENTS

(75) Inventor: German Von Thal, Laguna Niguel, CA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 10/927,217

(22) Filed: Aug. 26, 2004

(65) Prior Publication Data

US 2006/0060709 A1    Mar. 23, 2006

(51) Int. Cl.
*G01C 3/00* (2006.01)
*B64D 37/00* (2006.01)

(52) U.S. Cl. .................................. 244/135 A
(58) Field of Classification Search ............ 244/135 A, 244/1 TD, 135 R
See application file for complete search history.

(56) References Cited

U.S. PATENT DOCUMENTS

| | | | | |
|---|---|---|---|---|
| 2,973,163 A | * | 2/1961 | Goodliffe et al. ............... | 244/3 |
| 5,333,814 A | * | 8/1994 | Wallis ...................... | 244/1 TD |
| 6,454,212 B1 | * | 9/2002 | Bartov .................... | 244/135 A |
| 6,604,711 B1 | * | 8/2003 | Stevens et al. ......... | 244/135 A |
| 6,669,145 B1 | * | 12/2003 | Green .................... | 244/135 A |

* cited by examiner

*Primary Examiner*—Tien Dinh
(74) *Attorney, Agent, or Firm*—Alston & Bird LLP

(57) ABSTRACT

An in-flight refueling system, sensor system and method are provided for detecting and damping changes in the disposition of an elongate hose extending from a tanker aircraft during an in-flight refueling operation. The various embodiments provide a compact, lightweight, and low-profile sensor device that may be fitted to the elongate hose so as to detect oscillations in the elongate hose and transmit a signal to a hose retracting device carried by the tanker aircraft such that the hose retracting device retracts the elongate hose in response to the signal so as to counteract the occurrence of oscillations within the elongate hose. Thus, these embodiments may minimize the effect of oscillations in the elongate hose by selectively retracting the elongate hose in response to oscillations detected therein as it extends from the tanker aircraft during an in-flight refueling operation.

18 Claims, 4 Drawing Sheets

US 7,137,598 B2

IN-FLIGHT REFUELING SYSTEM, SENSOR SYSTEM AND METHOD FOR DAMPING OSCILLATIONS IN IN-FLIGHT REFUELING SYSTEM COMPONENTS

FIELD OF THE INVENTION

The present invention relates generally to in-flight refueling of a manned or unmanned aircraft using a probe and drogue in-flight refueling system, and specifically, providing a sensor system having the capability of communicating with a hose take-up device carried by a tanker aircraft. The hose take-up device may further be configured to extend and retract an elongate hose and attached drogue that may be trailed behind the tanker aircraft as part of an in-flight refueling operation. More particularly the present invention relates to the provision and placement of a sensor device near the drogue end of the elongate hose, wherein the sensor device is capable of sending data related to changes in disposition of the drogue end of the elongate hose in real time to the hose take-up device such that the elongate hose may be more rapidly retracted relative to the tanker aircraft so as to resist changes in the disposition of the elongate hose that may occur during the course of an in-flight refueling operation.

BACKGROUND OF THE INVENTION

In-flight refueling (or air-to-air refueling) is an important method for extending the range of both manned and unmanned aircraft traveling long distances over areas having no feasible landing or refueling points. Although in-flight refueling is a relatively common operation, especially for military aircraft, the passage of large amounts of fuel between a first aircraft (the tanker aircraft, for instance) and a second aircraft (the receiver aircraft, for instance) during an in-flight refueling operation may create a potentially dangerous situation, especially if components of the in-flight refueling system are allowed to move or oscillate in an uncontrolled manner. In addition, the close proximity of the first aircraft and the second aircraft during an in-flight refueling operation may create the danger of a mid-air collision between the aircraft. Such a danger may be increased if a component of an in-flight refueling system extending from the first aircraft is allowed to oscillate or move in an erratic manner relative to the first aircraft.

One conventional system for in-flight refueling is the probe and drogue in-flight refueling system wherein the first aircraft may extend an elongate flexible hose having an end attached to a drogue such that the second aircraft, having a refueling probe extending therefrom, may engage the drogue while in flight in order to initiate the transfer of fuel. An operator of the second aircraft is responsible for maneuvering the second aircraft such that the refueling probe extending therefrom may enter and engage the drogue. According to some conventional probe and drogue in-flight refueling systems, the engagement of the refueling probe with the drogue is accomplished as the second aircraft carefully accelerates with respect to the trailing drogue. The drogue may include, for instance, a catch mechanism for securing the refueling probe within the drogue so that the refueling probe may be securely fastened within the drogue during the transfer of fuel. The catch mechanism may include a fuel valve that may be opened when the probe is secured within the drogue. Thus, fuel may be pumped from the first aircraft into the elongate hose and down to the fuel valve disposed in the drogue so as to pressurize the elongate hose prior to the engagement of the probe carried by the second aircraft.

The elongate hose extending from the first aircraft may trail directly aft and below a fuselage of the first aircraft, or, in some instances, it may trail directly aft and below a refueling pod that may be carried by the first aircraft on, for instance, a wing hardpoint. In both of these cases, the elongate hose may be exposed to high wind speeds as it is trailed behind the first aircraft. For instance, the first aircraft may travel at speeds between about 180 and 400 knots during a conventional in-flight refueling operation. During an in-flight refueling operation using a probe and drogue in-flight refueling system, the elongate hose may trail aft and below the first aircraft in a stable arc such that the drogue operably engaged with the end of the elongate hose may be held in a relatively stable position relative to the first aircraft. In such cases, an operator of the second aircraft may position the second aircraft such that a refueling probe extending therefrom may engage the relatively stable drogue.

As in all mechanical systems, however, the elongate hose and attached drogue may experience oscillatory vibrations in response to applied forces (such as for instance, wind forces, or the impact force encountered as the second aircraft engages the drogue). In some cases, the elongate hose (and attached drogue) may begin to oscillate uncontrollably (at for instance, a resonance frequency) with respect to the first aircraft such that the drogue may move in an erratic pattern with respect to the first aircraft such that it may become difficult for an operator of the second aircraft to maneuver the second aircraft such that the refueling probe extending therefrom may be engaged with the drogue. In such cases, the elongate hose, may, for instance, rise into an upward arc relative to the first aircraft and/or oscillate relative to the first aircraft. Such motion may not only make the in-flight refueling operation difficult but also endanger both the first and second aircraft if the motion becomes extreme. In addition, if the second aircraft engages the drogue at a relatively high closure rate, slack may be introduced in the elongate hose and a traveling wave (such as a sinusoid or "sine" wave) may be propagated in the elongate hose that may travel from the drogue to the tanker aircraft (or the in-flight refueling system pod carried thereby). The safety of the crews that may operate the first and second aircraft may be in danger if the elongate hose and attached drogue begin to impact the control surfaces, in-flight refueling system pod, or other structural components of the first or second aircraft.

In such cases, conventional probe and drogue in-flight refueling systems may provide a guillotine system for cutting and jettisoning the elongate hose should oscillations or movement of the elongate hose and attached drogue become erratic enough so as to endanger the operators and/or other crew of either the first or second aircraft. However, it is undesirable to jettison the elongate hose and attached drogue as the first aircraft must cease in-flight refueling operations and return to an airfield for costly and complex repairs to the in-flight refueling system. Also, it is especially undesirable to jettison the elongate hose while the second aircraft is engaged with the attached drogue, as a length of elongate hose may be left hanging from the refueling receptacle carried by the second aircraft and may damage the second aircraft by striking a control surface or by being taken into a jet intake of the second aircraft.

Conventional probe and drogue in-flight refueling systems may also provide an elongate hose retracting device (such as, for instance a drum roller) disposed, for instance, in the fuselage of the first aircraft or in an in-flight refueling system pod carried thereby, for retracting and stabilizing the hose with respect to the first aircraft. More particularly, the retracting device may act to take up excess slack in the elongate hose in order to shorten the extension of the elongate hose in an attempt to dampen the oscillation of the elongate hose. In some conventional systems, sensors may be provided in or near the hose take-up device either within a fuselage of the tanker aircraft or within an in-flight refueling system pod carried thereby). Such sensors are configured to detect slack in the elongate hose after it has been propagated up the length of the elongate hose to the location of the sensor. Such sensors have limited capacity to limit the damage that may be caused by traveling waves, however, as slack in the elongate hose may not be detected until the traveling wave has already reached the sensor, by which time, the elongate hose may have already struck and damaged the tanker aircraft or the in-flight refueling system pod carrying the sensor and take-up device.

Therefore, there exists a need for an in-flight refueling system, sensor system, and method for detecting slack and traveling oscillations in the elongate hose at the point where they begin (such as, for instance, near the drogue end of the elongate hose) such that the hose retracting device may be more quickly controlled to take-up the slack generated in the elongate hose so as to prevent potentially dangerous changes in disposition that may occur in probe and drogue in-flight refueling system components, such as for instance, an elongate hose trailing aft and below a first aircraft (serving as, for instance, a tanker aircraft). More particularly, there exists a need for a sensor system that may be more effective at detecting oscillations and/or changes in the disposition of the elongate hose that begin near the drogue end of the elongate hose and expeditiously transmitting signals to the retracting device such that such oscillations and/or changes in disposition may be effectively resisted by taking up a section of the elongate hose in response to the signals.

Thus, it would be advantageous to provide an in-flight refueling system, sensor system, and method for quickly detecting and damping oscillations or changes in the disposition of the elongate hose and attached drogue that may occur during an in-flight refueling operation. Also, it would be advantageous to provide a device for detecting and transmitting data related to oscillation of the elongate hose and attached drogue that is simple, robust, lightweight, and compact enough to be mounted on or near the drogue end of existing elongate hoses or on an existing drogue without the need to modify existing in-flight refueling system components.

SUMMARY OF THE INVENTION

The embodiments of the present invention satisfy the needs listed above and provide other advantages as described below. The in-flight refueling system, according to one embodiment, includes a tanker aircraft, an elongate hose having a first end carried by the tanker aircraft and an opposing second end configured to extend from the tanker aircraft, a retracting device carried by the tanker aircraft and configured to be capable of extending and retracting the elongate hose relative to the tanker aircraft, and a sensor device operably engaged with a portion of the elongate hose and capable of detecting a change in disposition of the portion of the elongate hose and transmitting a signal to the retracting device. The signal is related to the change in disposition such that the retracting device retracts the elongate hose in response to the signal so as to resist the change in disposition of the elongate hose.

Thus, the sensor device may be configured to detect slack or impending oscillations in a portion of the elongate hose and generate a signal to be transmitted to the retracting device so that the elongate hose may be quickly retracted so as to resist a change in disposition of the elongate hose that may occur in response to an external force exerted on the elongate hose as it is extended from the tanker aircraft. Furthermore, according to other embodiments of the in-flight refueling system, the sensor device may be operably engaged with the second end of the elongate hose and may also be configured to be operably engaged with a drogue located on the second end of the elongate hose.

According to other embodiments, the sensor device of the present invention may comprise an accelerometer or other motion detecting device suitable for detecting a change in disposition and/or an oscillation in the elongate hose as it is extended from the tanker aircraft. Furthermore, in some embodiments, the in-flight refueling system of the present invention may further comprise a transmitter device in communication with the sensor device and configured to be capable of transmitting the signal in response to the change in disposition detected by the sensor device. The in-flight refueling system may also comprise a receiver device in communication with the retracting device and configured to be capable of receiving the signal and controlling the retracting device to retract the elongate hose in response to the signal, so as to resist the change in disposition and/or oscillation of the elongate hose. In such embodiments, the transmitter device may also include a transducer configured to convert the change in disposition to a corresponding signal, and an optical source in communication with the transducer and configured to transmit an optical signal to the receiver device based on the corresponding signal produced by the transducer. Further, the receiver device may also include an optical receiver configured to be capable of receiving the optical signal and a converter in communication with the optical receiver and the retracting device configured to be capable of converting the optical signal into a control input for the retracting device such that the retracting device may retract the elongate hose in response to the signal.

The embodiments of the present invention also provide a method for facilitating the stabilization of an elongate hose having a first end carried by a tanker aircraft and an opposing second end configured to extend from the tanker aircraft. For instance, according to some embodiments, the method comprises the steps of: detecting a change in disposition of a portion of the elongate hose; transmitting a signal to a retracting device carried by the tanker aircraft wherein the signal is based on the change in disposition; and retracting the elongate hose in response to the signal so as to resist the change in disposition of the portion of the elongate hose. These steps may thus cause resistance to any change in disposition of the elongate hose that may occur in response to an external force exerted on the elongate hose as it is trailed aft and below a tanker aircraft (such as the force exerted on the hose as a second aircraft engages the drogue that may be attached to the second end of the elongate hose). According to other method embodiments, the converting step may further comprise producing a first signal in correspondence to the change in disposition; and transmitting an optical signal based upon the first signal. In other method embodiments, the receiving step may further comprise receiving the optical signal and converting the optical signal into a control input that is provided to the retracting device such that the retracting device is capable of retracting the elongate hose in response thereto, so as to resist the change in disposition of the portion of the elongate hose.

Thus the various embodiments of the in-flight refueling system, sensor system, and method of the present invention provide many advantages that may include, but are not limited to: providing an in-flight refueling system that may resist changes in disposition of an end of the elongate hose trailing from a tanker aircraft during an in-flight refueling operation, providing a sensor device that is operably engaged with a portion of the elongate hose and is capable of detecting and transmitting signals indicating a change in disposition of the elongate hose to a retracting device carried by the tanker aircraft, and providing a sensor device that may be operably engaged with an end of the elongate hose (or with a drogue that may be attached to the elongate hose) such that the sensor device is capable of transmitting signals remotely to the retracting device carried by the tanker aircraft related to a change in disposition of the end of the elongate hose.

These advantages and others that will be evident to those skilled in the art are provided in the in-flight refueling system, sensor system, and method of the present invention.

BRIEF DESCRIPTION OF THE DRAWINGS

Figure 1:
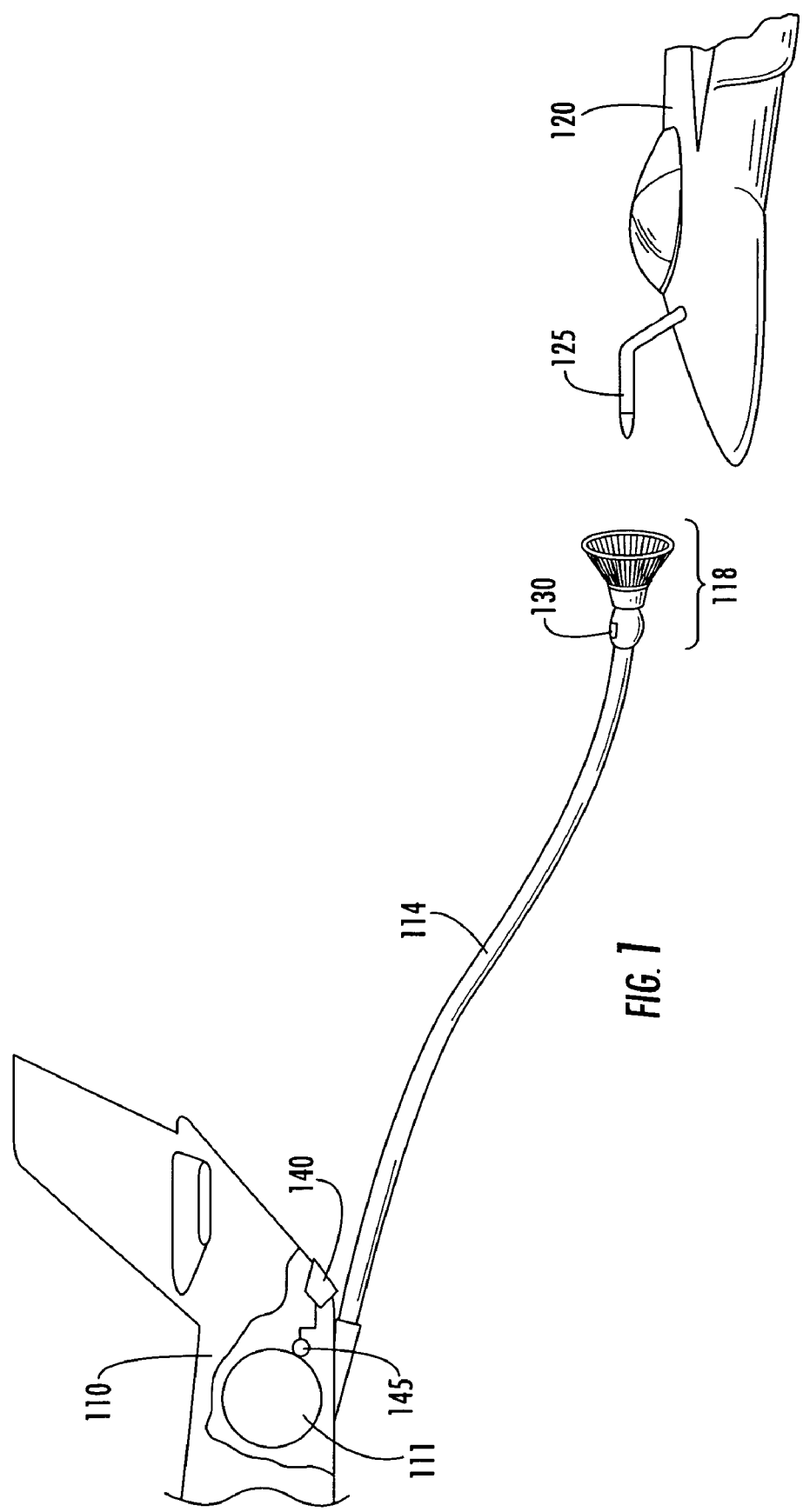
Figure 2:
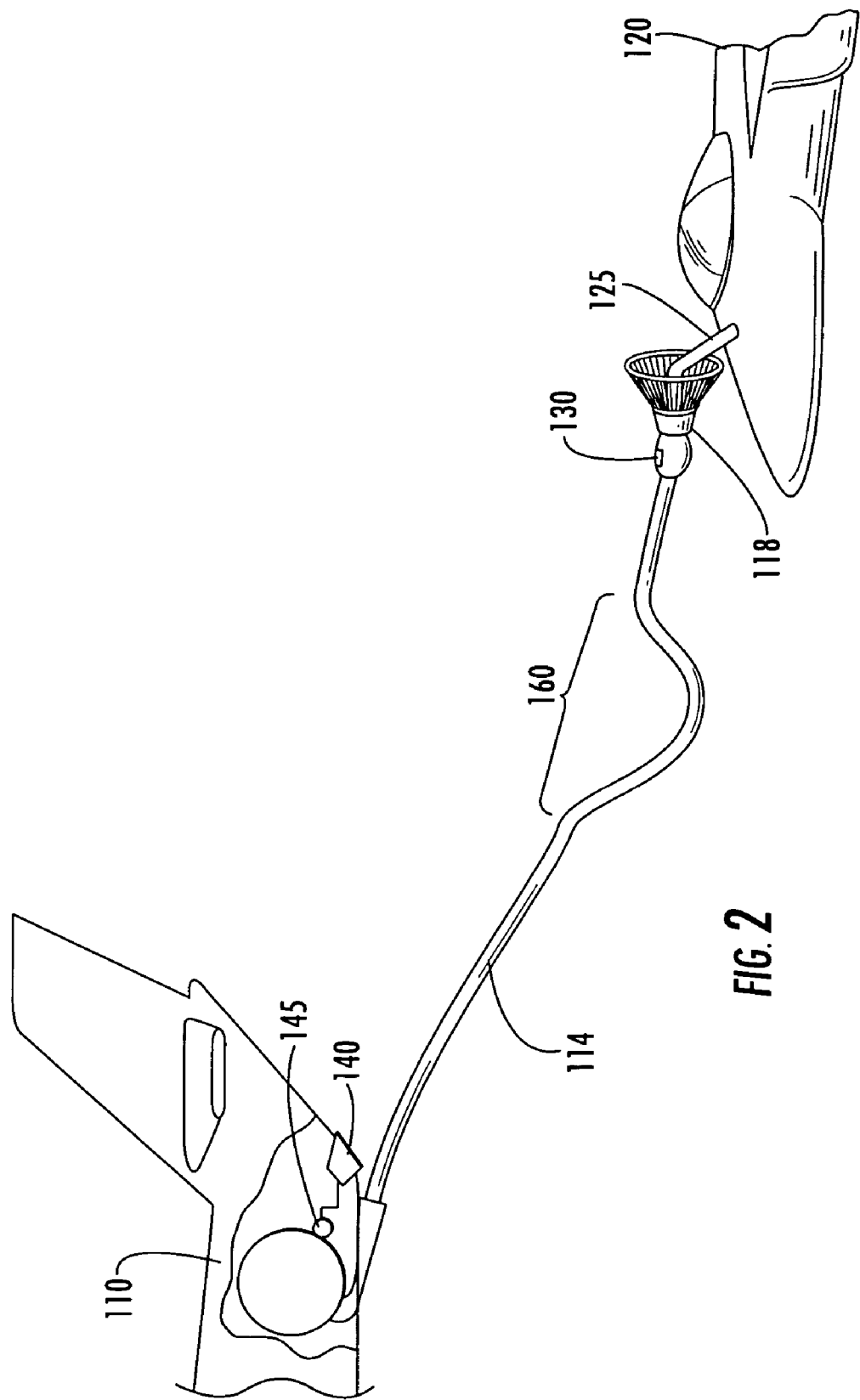
Figure 3:
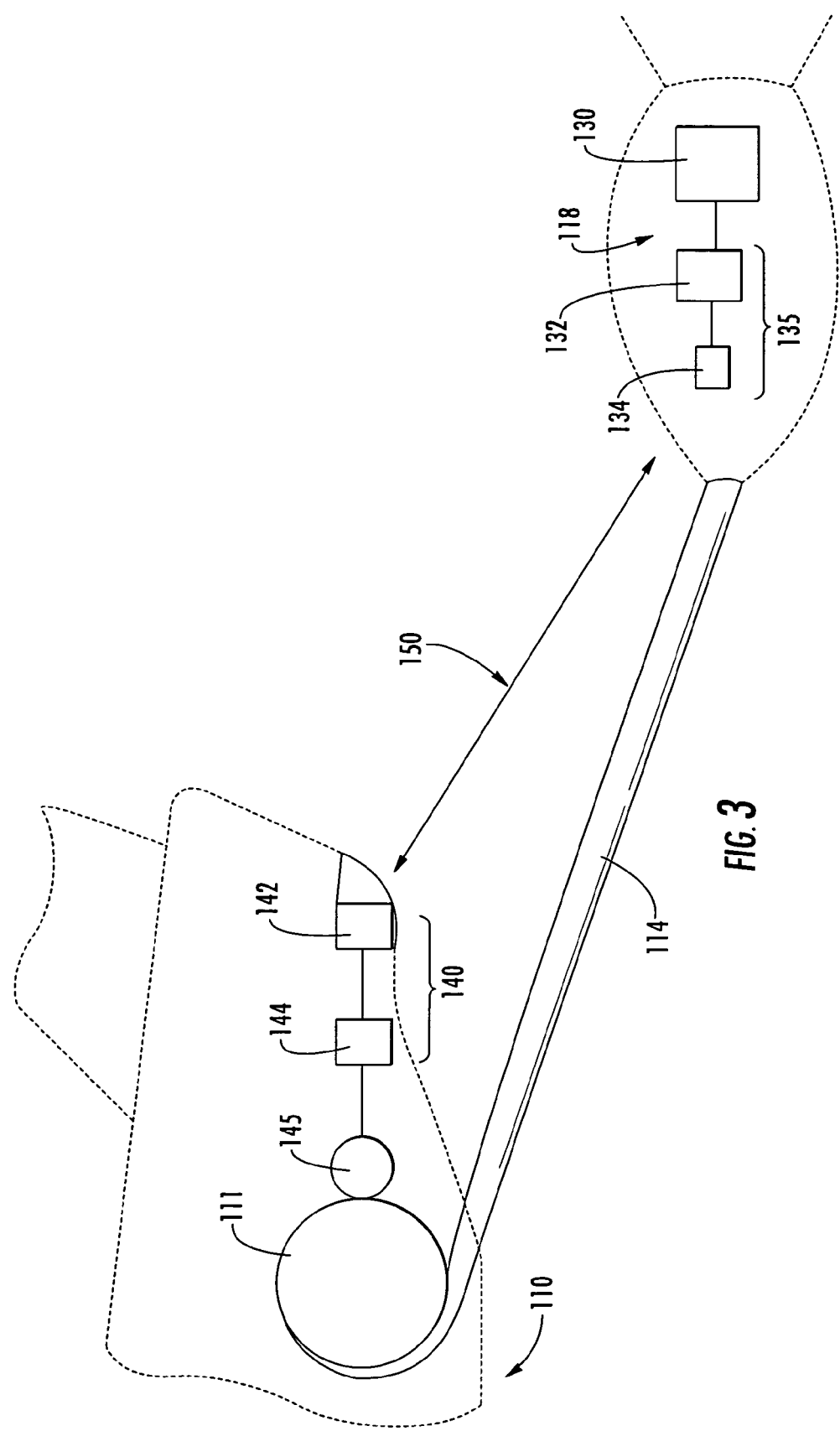
Figure 4:
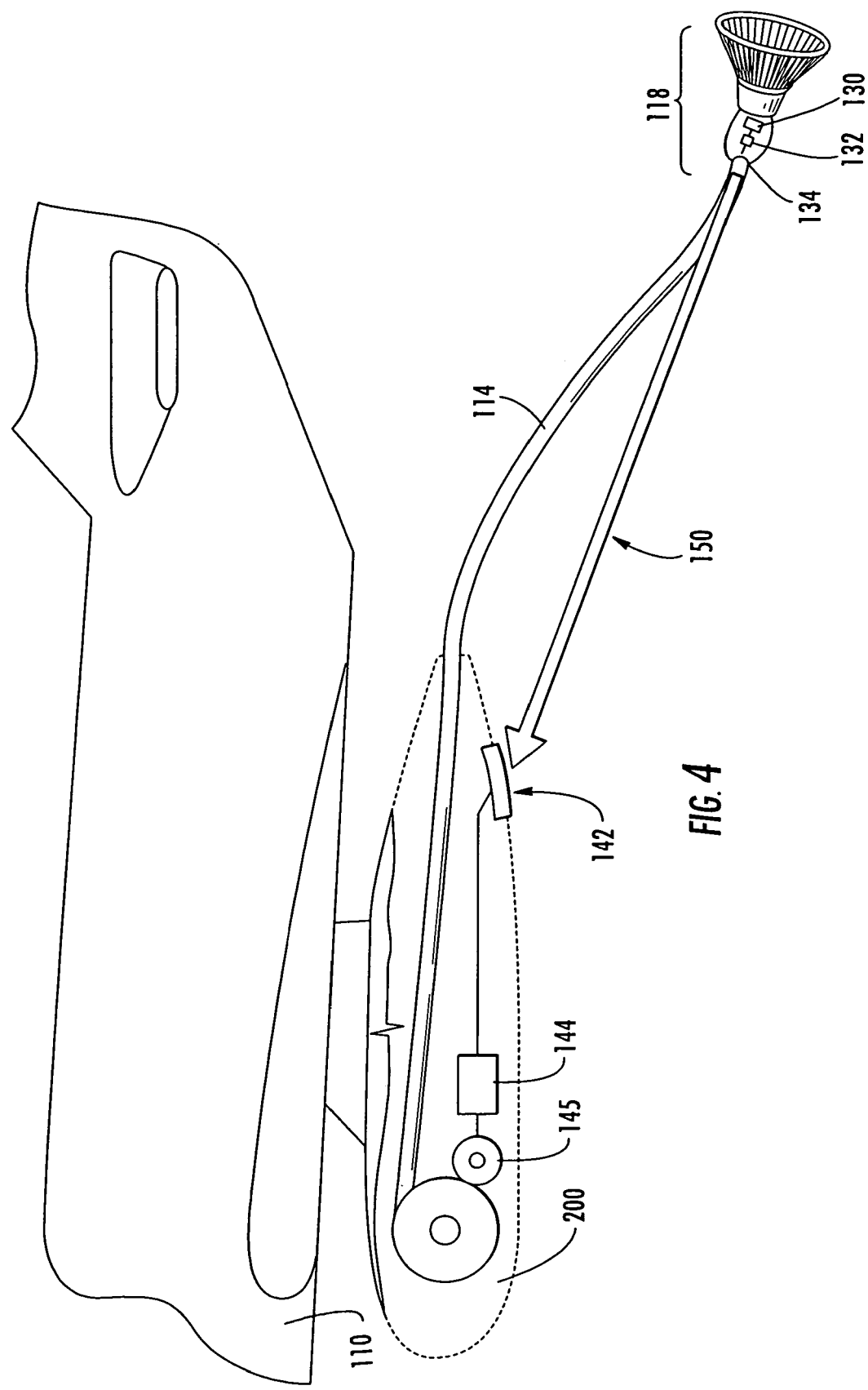

Having thus described the invention in general terms, reference will now be made to the accompanying drawings, which are not necessarily drawn to scale, and wherein:

FIG. 1 shows a side view of a tanker aircraft and an elongate hose and attached drogue extending therefrom and including a sensor device according to one embodiment of the present invention;

FIG. 2 shows a side view of a tanker aircraft and an elongate hose and attached drogue extending therefrom wherein the drogue has been subjected to a forward change in disposition due to an engagement force exerted by a second aircraft on the drogue;

FIG. 3 shows a schematic side view of a sensor system according to one embodiment of the present invention; and FIG. 4 shows a schematic side view of a sensor system according to one embodiment of the present invention wherein the sensor system is installed in a pod-based in-flight refueling system.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 shows an in-flight refueling system according to one embodiment of the present invention including a tanker aircraft 110 and an elongate hose 114 extending therefrom. The elongate hose 114 comprises a first end (not shown) that is carried by the tanker aircraft 110 and may be operably engaged with a fuel reservoir located within a fuselage, wing structure, or other internal compartment within the tanker aircraft 110. In some embodiments, the first end of the elongate hose 114 may further be operably engaged with a refueling pod 200 (see FIG. 4) that may be configured to be carried by a hardpoint located, for instance, on an outboard portion of a wing of the tanker aircraft 110. Furthermore, the elongate hose 114 may be configured to be capable of being taken up from an extended position by a retracting device 111 and rolled up on the retracting device 111 that may comprise, for instance, a rotating drum assembly that may be disposed within a fuselage of the tanker aircraft 110 or within a refueling pod 200 carried on a wing hardpoint of the tanker aircraft 110. Also shown in FIG. 1 is the second end of the elongate hose 114 extending aft and below the tanker aircraft 110 and operably engaged with a drogue 118. The elongate hose 114 and drogue 118 attached thereto are thus positioned so as to be capable of being engaged by, for instance, a refueling probe 125, carried by a second aircraft 120 which may approach the tanker aircraft 110 from the aft and below as part of an in-flight refueling operation.

FIG. 1 also shows a sensor device 130 according to one embodiment of the present invention, operably engaged with the drogue 118. According to other embodiments, the sensor device 130 may be operably engaged with any portion of the elongate hose 114 and/or integrated therein so as to be capable of detecting a change in disposition of the portion of the elongate hose 114 (as described more fully below). The sensor device 130 may be in communication with the retracting device 111 carried by the tanker aircraft 110 such that the sensor device may transmit a signal 150 (via a wireless method such as, for instance, an optical signal, as described more fully below) to the retracting device 111. In some instances, the signal 150 may alternatively be transmitted via wire from the sensor device 130 to the retracting device 111 wherein the wire may be embedded in or carried by the elongate hose 114. The signal transmitted by the sensor device 130 may be related to the change in disposition of the portion of the elongate hose 114 that carries the sensor device 130 (or, in the depicted embodiment, the change in disposition of the drogue 118) such that the retracting device 111 may be capable of retracting the elongate hose 114 in response to the signal so as to resist the change in disposition of the portion of the elongate hose 114 with which the sensor device 130 may be operably engaged. In some embodiments, the signal transmitted by the sensor device 130 may be configured to include data as to the extent through which the elongate hose 114 has moved should be retracted so as to effectively resist the change in disposition of the elongate hose 114. Thus, the sensor device 130 may be configured to actuate the retracting device 111 so as to remove slack and/or maintain adequate tension in the elongate hose 114 so as to resist changes in the disposition of a portion of the elongate hose 114.

Also, as shown in FIG. 1, the tanker aircraft 110 may also carry a receiver device 140 in communication with the retracting device 111 (or a servo motor 145 configured to drive the retracting device 111, as shown in FIG. 1) such that the receiver device is capable of receiving the signal transmitted by the sensor device 130 and controlling the servo motor 145 to cause the retracting device 111 to retract the elongate hose 114 relative to the tanker aircraft 110 so as to resist a change in disposition in the elongate hose 114 that may occur in response to an external force. The receiver device 140 and associated components are described in more detail below in conjunction with FIG. 3.

FIG. 2 shows one example of a change in disposition of a portion of the elongate hose 114 in response to an applied external force that the in-flight refueling system, sensor system, and method embodiments of the present invention are configured to resist. The elongate hose 114 may be subjected to aerodynamic forces such as wind and drag forces, as well as impact forces as the drogue 118 is engaged by a second aircraft 120. For instance, as shown in FIG. 2, the second aircraft 120 (carrying a refueling probe 125) may accelerate relative to the elongate hose 114 and attached drogue 118 that extend aft and below the tanker aircraft 110 as part of an in-flight refueling operation so as to bring the refueling probe 125 into engagement with the drogue 118 (such that the refueling probe 125 may come into fluid communication with the in-flight refueling system carried by the tanker aircraft 110 and such that the second aircraft may receive fuel therefrom). In some cases, however, the second aircraft 120 may accelerate excessively such that the impact of the refueling probe 125 with the drogue 118 may cause a forward change in disposition and/or a sudden forward acceleration of the drogue 118 as well as the second end of the elongate hose 114. This, in turn may cause a traveling wave 160 (such as a sine wave) to be created in the elongate hose 114 that may travel, for instance, from the drogue 118 up to the tanker aircraft 110 wherein the elongate hose 114 (and the slack created therein by the traveling wave 160) may impact a fuselage and/or other surface of the tanker aircraft 110 and cause severe damage. Sudden forward acceleration of the drogue 118 may also be caused by sudden tailwinds that may result in a forward change in disposition of the elongate hose 114 which may, in turn, generate a traveling wave 160 or sine wave. Additionally, if left unchecked, an impact of the traveling wave 160 with the tanker aircraft 110 may cause the traveling wave 160 to travel back down the elongate hose 114 to the second aircraft 120 and cause similar impacts (and possible damage) thereto. Thus, embodiments of the present invention may comprise a sensor device 130 operably engaged with the drogue 118 (or other portion of the elongate hose 114) that is capable of detecting a change in disposition of the drogue 118 (such as, for instance, the forward change in disposition that may accompany the impact of a refueling receptacle 125 with the drogue 118). As introduced above, the sensor device 130 may be capable of transmitting a signal 150 (see FIG. 3) related to the detected change in disposition to the retracting device 111 (such as a drum roller) carried by the tanker aircraft 110 such that the retracting device 111 may be capable of retracting the elongate hose 114 in response to the change in disposition of the drogue 118 in an expeditious manner so as to restore tension in the elongate hose 114 and thereby prevent the propagation of the traveling wave 160 up the elongate hose 114 to the tanker aircraft 110 (or in some instances, to an in-flight refueling pod (See FIG. 4) carried thereby). This may be accomplished, for instance, by retracting the elongate hose 114 such that any slack introduced into the elongate hose 114 as it extends from the tanker aircraft 110 is removed prior to further propagation of a traveling wave 160.

FIG. 3 shows a schematic view of the in-flight refueling system, according to one embodiment of the present invention wherein the sensor device 130 is operably engaged with the drogue 118 attached to the second end of the elongate hose 114. The sensor device 130 may comprise, for instance, an accelerometer, motion transducer or other device suitable for detecting a change in disposition or a sudden acceleration in the portion of the elongate hose 114 with which it may be operably engaged. Also as shown in FIG. 3 the sensor device 130 may be in communication with a transmitter device 135 configured to be capable of transmitting a signal 150 in response to a change in disposition of a portion of the elongate hose 114 or the drogue 118 with which the sensor device 130 may be operably engaged. The signal generated by the transmitter device 135 may comprise, for instance, data related to the change in disposition or a command that may be transmitted to the retracting device 111 carried by the tanker aircraft 110 such that the elongate hose 114 may be retracted thereby to resist the detected change in disposition. The transmitter 135 may be configured to be capable of transmitting the signal 150 to a receiver device 140 carried by the tanker aircraft 110 by a variety of wired and wireless techniques. For instance, the transmitter 135 may be configured to send an electrical signal to the receiver device 140 via a wire embedded in or carried by the elongate hose 114 from the location of the sensor device 130 to the location of the retracting device 111. In other embodiments, the transmitter 135 may be configured to send a radio signal via wireless methods to the receiver device 140 which may, in some cases, comprise a radio receiver. Additionally, as described more fully below, the transmitter device 140 may be configured to transmit the signal 150 as an optical signal (such as a real-time modulated light signal) to the receiver device 140 via either fiber-optic conduits carried by the elongate hose 114 or as an optical signal sent via line-of-sight from the transmitter device 135 to the receiver device 140.

In some embodiments, the transmitter device 135 may further comprise a transducer 132 configured to convert the change in disposition (such as a sudden forward acceleration, as described above) of the portion of the elongate hose 114 to a corresponding signal, such as by converting an electrical signal produced by an accelerometer into a corresponding optical or radio signal for transmission. In one embodiment, for example, the transmitter device may further comprise an optical source 134 in communication with the transducer 132 (via wire or wireless techniques) that may be configured to transmit a real-time modulated optical signal 150 to the receiver device 140 that may be carried by the tanker aircraft 110 such that the receiver device 140 may further communicate the optical signal 150 (after, in some cases, converting the optical signal to an appropriate control input) to the retracting device 111. The transducer 132 may comprise an electromechanical device, a piezoelectric device, magnetostrictive device, a variable resistance device, or any other device suitable for converting the output of the sensor device 130 into a corresponding signal that may be transferred either to the optical source 134 for transmission to the receiver device 140 or directly to the receiver device 140 carried by the tanker aircraft 110. In addition, in some embodiments the optical source 134 may comprise, for instance, an LED unit or LED array configured to generate a real-time modulated optical signal in response to the corresponding signal generated by the transducer 132.

As shown schematically in FIGS. 1, 2, and 3, the receiver device 140 carried by the tanker aircraft 110 may be positioned on an outer surface of a fuselage of the tanker aircraft 110 so as to be capable of receiving the signal generated by the transmitter device 135 in communication with the sensor device 130 (such as an accelerometer) that is operably engaged with a portion of the elongate hose 114. In embodiments wherein the signal 150 transmitted from the transmitter device 135 to the receiver device 140 is an optical signal (such as a real-time modulated optical signal generated by an LED device), the receiver device 140 may be carried on an external surface of the tanker aircraft 110 (or the external surface of a refueling pod 200 carried thereby (see FIG. 4)) so as to have a field of view encompassing the possible positions of the transmitter device 135 relative to the receiver device 140. In other embodiments, the receiver device 140 may be carried within a fuselage of the tanker aircraft 110 (or within a refueling pod carried on a wing hardpoint thereof). In such embodiments, the fuselage or refueling pod may comprise a window or aperture defined therein such that the receiving device 140 may have a field of view encompassing the possible positions of the transmitter device 135 relative to the receiver device 140. One skilled in the art will appreciate that the receiver device 140 may be positioned at any point on or within a fuselage of the tanker aircraft 110 (or on or within a refueling pod carried thereby) so long as the receiver device is capable of receiving the signal 150 produced by the sensor device 130 and the transmitter device 135 in communication therewith. For instance, in some cases, the transmitter device 135 may comprise a radio transmitter, or a wire-based transmitter configured to send the signal 150 via a wire connection that may be embedded, for instance, within the elongate hose 114 such that the receiver device 140 need not be in visual communication with the transmitter device 135 in order to receive the signal 150 transmitted thereby. In addition, in some embodiments, the signal 150 may comprise a real-time modulated optical signal that may be transmitted via fiber-optic light conduits from the transmitter device 135 to the receiver device 140 wherein the fiber-optic light conduits may be embedded in or carried by the elongate hose 114 such that the signal 150 may be transferred in substantially real-time (at the speed of light) even in cases where the receiver device 140 may be out of visual contact with the transmitter device 135 (such as in cases where obstructions may prevent a clear field of view from the receiver device 140 to the transmitter device 135).

As shown in the schematic view of FIG. 3, in some optical signal embodiments, the receiver device 140 may comprise an optical receiver 142 configured to be capable of receiving the signal 150 transmitted by the receiver device 135 that is in communication with the sensor device 130 (such as an accelerometer). The optical receiver 142 may comprise, for instance, a photo cell or other receiver device suitable for receiving a modulated optical signal from, for instance, an LED device or other type of optical source 134. In other embodiments, the receiver device 140 may comprise other types of receivers, including radio receivers, or other electrical receivers that may be suitable for receiving a signal 150 that may be generated by the sensor device 130 to indicate that a change in disposition of a portion of the elongate hose 114 may be occurring. In addition, the receiver device 140 may further comprise a converter 144 in communication with the optical receiver 142 (or other receiver type, as discussed above). In some embodiments, the converter 144 may comprise, for instance, a transducer, amplifier, or other electrical device, configured to convert and/or modify the signal 150 into an appropriate control input, such as, for instance, an electrical signal. The converter 144 may also be in communication with the retracting device 111 and may be configured to be capable of converting the signal 150 into the control input that it may send to the retracting device 111 such that the retracting device 111 retracts the elongate hose 114 in response to the signal 150 sent by the transmitter device 135 in response to the change in disposition detected by the sensor device 130. In some embodiments, the converter 144 may be capable of producing a control input for a servo motor 145 that is operably engaged with, and capable of controlling, the retracting device 111. In embodiments using real-time modulated optical signals as the signal 150, the converter may further be configured to convert the signal 150 received by, for instance, the optical receiver 142 into a control input suitable for controlling a servo motor 145 configured to actuate the retracting mechanism 111.

FIG. 4 shows one embodiment of the in-flight refueling system of the present invention installed in a pod 200 that may be carried under a wing or a fuselage of the tanker aircraft 110 such that the elongate hose 114 and attached drogue 118 may be extended aft and below the pod 200. As in the embodiments described above, slack and traveling waves generated in the elongate hose 114 may also damage the pod 200 or the tanker aircraft 110 carrying it if such traveling waves are not damped by a quick retraction of the elongate hose 114 relative to the pod 200. In this embodiment, the sensor device 130 is shown embedded in or carried by the drogue 118 so as to be capable of detecting changes in disposition of the drogue (such as a sudden forward acceleration). The sensor device 130 is shown in communication (via wire or wireless connection) with a transducer 132 also carried by the drogue and configured to convert the detected change in disposition to a corresponding signal (such as a time varying voltage). In addition, an optical source 134 (such as an LED or LED array) may be in communication with the transducer 132 wherein the optical source 134 may be configured to transmit an optical signal 150 to an optical receiver 142 that may be carried by the pod 200. As described above, the optical signal 150 may be generated in real-time and modulated to indicate the extent and direction of the change in disposition detected by the sensor device 130 such that the signal 150 may convey such information to the retracting device 111 carried by the pod 200. In turn, the retracting device 111 may then be capable of expeditiously responding to the detected change in disposition of the drogue 118 so as to take up slack that may form in the elongate hose 114 and initiate a traveling wave 160 (see FIG. 2) in the elongate hose 114 that may damage the pod 200 or the tanker aircraft 110.

Also, as described above, the pod 200 may also carry a converter 144 in communication with the optical receiver 142 that may be configured to be capable of converting the signal 150 into a control input that it may send to a servo motor 145 configured to actuate the retracting device 111 (such as a roller drum) and retract the elongate hose 114 thereby resisting the change in disposition of the drogue 118 that is detected by the sensor device 130 operably engaged therewith.

Referring again to FIGS. 1, 2, and 3, a method for facilitating the stabilization of an elongate hose 114 having a first end carried by a tanker aircraft 110 and an opposing second end (operably engaged with a drogue 118) configured to extend from the tanker aircraft 110 is described. In one embodiment, the method may comprise the steps of: detecting a change in disposition of a portion of the elongate hose 114 (or a change in disposition of a drogue 118 attached thereto; transmitting a signal 150 related to the change in disposition from a sensor device 130 (operably engaged with the portion of the elongate hose 114 or the drogue 118) to a retracting device 111 carried by the tanker aircraft 110; and retracting the elongate hose 114 in response to the signal 150, thereby resisting the change in disposition of the portion of the elongate hose 114.

According to some other embodiments, the method of the present invention may further comprise the steps of producing a first signal (such as an electrical signal produced by, for instance, a transducer 132) in correspondence to the change in disposition; and transmitting an optical signal 150 (from, for instance, an optical source 134 such as an LED device or LED array) based upon the first signal. Additionally, methods of the present invention may further comprise the steps of receiving the optical signal 150 (at, for instance, an optical receiver 142 such as a photo cell); and converting the optical signal 150 into a control input that is provided to the retracting device 111 (via, for instance a converter 144 and/or servo motor 145) such that the retracting device 111 is capable of retracting the elongate hose 114 in response to the control input, so as to damp the change in disposition of the portion of the elongate hose 114.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An in-flight refueling system comprising:
   at tanker aircraft;
   an elongate hose having a first end carried by the tanker aircraft and an opposing second end configured to extend from the tanker aircraft;
   a retracting device carried by the tanker aircraft and configured to be capable of extending and retracting the elongate hose relative to the tanker aircraft; and
   a sensor device operably engaged with and carried by a portion of the elongate hose and capable of detecting a change in disposition of the portion of the elongate hose and transmitting a signal to the retracting device, the signal being related to the change in disposition such that the retracting device is capable of retracting the elongate hose in response to the signal, thereby resisting the change in disposition of the portion of the elongate hose.

2. An in-flight refueling system according to claim 1, wherein the portion of the elongate hose is proximate the second end of the elongate hose.

3. An in-flight refueling system according to claim 1, further comprising a drogue operably engaged with the second end of the elongate hose.

4. An in-flight refueling system according to claim 3, wherein the sensor device is operably engaged with the drogue and capable of detecting a change in disposition of the drogue and transmitting a signal to the retracting device, the signal being related to the change in disposition such that the retracting device is capable of retracting the elongate hose in response to the signal, thereby resisting the change in disposition of the drogue and the elongate hose operably engaged therewith.

5. An in-flight refueling system according to claim 1, wherein the sensor device further comprises an accelerometer.

6. An in-flight refueling system according to claim 1, further comprising:
   a transmitter device in communication with the sensor device and configured to be capable of transmitting the signal in response to the change in disposition detected thereby; and
   a receiver device in communication with the retracting device and configured to be capable of receiving the signal and communicating with the retracting device such that the retracting device is capable of retracting the elongate hose in response to the signal, thereby resisting the change in disposition of the portion of the elongate hose.

7. An in-flight refueling system according to claim 6 wherein the transmitter device comprises:
   a transducer configured to convert the change in disposition to a corresponding signal; and
   an optical source in communication with the transducer and configured to transmit an optical signal to the receiver device in response to the corresponding signal.

8. An in-flight refueling system according to claim 6, wherein the receiver device comprises:
   an optical receiver configured to be capable of receiving the signal; and
   a converter in communication with the optical receiver and the retracting device and configured to be capable of converting the signal into a control input and sending the control input to the retracting device such that the retracting device retracts the elongate hose in response to the signal, thereby damping the change in disposition of the portion of the elongate hose.

9. An in-flight refueling system adapted to be carried by a tanker aircraft comprising:
   an elongate hose having a first end carried by the tanker aircraft and an opposing second end configured to extend from the tanker aircraft;
   a retracting device carried by the tanker aircraft and configured to be capable of extending and retracting the elongate hose relative to the tanker aircraft; and
   a sensor device operably engaged with and carried by a portion of the elongate hose and capable of detecting a change in disposition of the portion of the elongate hose and transmitting a signal to the retracting device, the signal being related to the change in disposition such that the retracting device is capable of retracting the elongate hose in response to the signal, thereby resisting the change in disposition of the portion of the elongate hose.

10. An in-flight refueling system according to claim 9, wherein the portion of the elongate hose is proximate the second end of the elongate hose.

11. An in-flight refueling system according to claim 9, further comprising a drogue operably engaged with the second end of the elongate hose.

12. An in-flight refueling system according to claim 11, wherein the sensor device is operably engaged with the drogue and capable of detecting a change in disposition of the drogue and transmitting a signal to the retracting device, the signal being related to the change in disposition such that the retracting device is capable of retracting the elongate hose in response to the signal, thereby resisting the change in disposition of the drogue and the elongate hose operably engaged therewith.

13. An in-flight refueling system according to claim 9, wherein the sensor device further comprises an accelerometer.

14. An in-flight refueling system according to claim 9, further comprising:
   a transmitter device in communication with the sensor device and configured to be capable of transmitting the signal in response to the change in disposition detected thereby; and
   a receiver device in communication with the retracting device and configured to be capable of receiving the signal and communicating with the retracting device such that the retracting device is capable of retracting the elongate hose in response to the signal, thereby resisting the change in disposition of the portion of the elongate hose.

15. An in-flight refueling system according to claim 14 wherein the transmitter device comprises:
- a transducer configured to convert the change in disposition to a corresponding signal; and
- an optical source in communication with the transducer and configured to transmit an optical signal to the receiver device in response to the corresponding signal.

16. An in-flight refueling system according to claim 14, wherein the receiver device comprises:
- an optical receiver configured to be capable of receiving the signal; and
- a converter in communication with the optical receiver and the retracting device and configured to be capable of converting the signal into a control input and sending the control input to the retracting device such that the retracting device retracts the elongate hose in response to the signal, thereby damping the change in disposition of the portion of the elongate hose.

17. An in-flight refueling system adapted to be carried by a tanker aircraft comprising:
- an elongate hose having a first end carried by the tanker aircraft and an opposing second end configured to extend from the tanker aircraft;
- a retracting device carried by the tanker aircraft and configured to be capable of extending and retracting the elongate hose relative to the tanker aircraft;
- a sensor device operably engaged with a portion of the elongate hose and capable of detecting a change in disposition of the portion of the elongate hose and transmitting a signal to the retracting device;
- a transmitter device in communication with the sensor device and configured to be capable of transmitting a signal in response to the change in disposition detected thereby, the signal being related to the change in disposition, the transmitter device comprising:
  - a transducer configured to convert the change in disposition to a corresponding signal; and
  - an optical source in communication with the transducer and configured to transmit an optical signal to the receiver device in response to the corresponding signal; and
- a receiver device in communication with the retracting device and configured to be capable of receiving the signal and communicating with the retracting device such than the retracting device is capable of retracting the elongate hose in response to the signal, thereby resisting the change in disposition of the portion of the elongate hose.

18. An in-flight refueling system adapted to be carried by a tanker aircraft comprising:
- an elongate hose having a first end carried by the tanker aircraft and an opposing second end configured to extend flow the tanker aircraft;
- a retracting device carried by the tanker aircraft and configured to be capable of extending and retracting the elongate hose relative to the tanker aircraft;
- a sensor device operably engaged with a portion of the elongate hose and capable of detecting a change in disposition of the portion of the elongate hose and transmitting a signal to the retracting device;
- a transmitter device in communication with the sensor device and configured to be capable of transmitting a signal in response to the change in disposition detected thereby, the signal being related to the change in disposition, the transmitter device comprising:
  - a transducer configured to convert the change in disposition to a corresponding signal; and
  - an optical source in communication with the transducer and configured to transmit an optical signal to the receiver device in response to the corresponding signal; and
- a receiver device in communication with the retracting device, the receiver device comprising:
  - an optical receiver configured to be capable of receiving the optical signal; and
  - a converter in communication with the optical receiver and the retracting device and configured to be capable of converting the optical signal into a control input and sending the control input to the retracting device such that the retracting device retracts the elongate hose in response to the signal, thereby damping the change in disposition of the portion of the elongate hose.

* * * * *